United States Patent
Johnson et al.

(10) Patent No.: US 7,025,999 B2
(45) Date of Patent: Apr. 11, 2006

(54) CHEWING GUM HAVING PROLONGED SENSORY BENEFITS

(75) Inventors: Sonya S. Johnson, LaGrange Highlands, IL (US); Michael J. Greenberg, Northbrook, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 364 days.

(21) Appl. No.: 10/127,858

(22) Filed: Apr. 22, 2002

(65) Prior Publication Data

US 2003/0072842 A1    Apr. 17, 2003

Related U.S. Application Data

(60) Provisional application No. 60/290,380, filed on May 11, 2001.

(51) Int. Cl.
*A23G 3/30*    (2006.01)

(52) U.S. Cl. .............................................. 426/3; 426/5

(58) Field of Classification Search ..................... 426/3, 426/5
See application file for complete search history.

(56) References Cited

U.S. PATENT DOCUMENTS

| 4,045,581 A | 8/1977 | Mackay et al. |
| 4,064,274 A | 12/1977 | Mackay et al. |
| 4,568,537 A | 2/1986 | Hoerman et al. |
| 4,758,438 A | 7/1988 | Stroz et al. |
| 4,762,930 A | 8/1988 | Rieger et al. |
| 4,906,455 A | 3/1990 | Hoerman |
| 6,159,509 A | 12/2000 | Johnson et al. |

*Primary Examiner*—Arthur L. Corbin
(74) *Attorney, Agent, or Firm*—Bell, Boyd & Lloyd LLC

(57) ABSTRACT

Chewing gums and methods of making same that have prolonged and enhanced sensory benefits are provided. The chewing gums of the present invention include a hydrophobic sweetener, a sensorally active component or trigeminal stimulant, such as a flavor, in addition to other typical chewing gum ingredients. The hydrophobic sweeteners are composed of sweet organic compounds that have a low water solubility.

13 Claims, No Drawings

CHEWING GUM HAVING PROLONGED SENSORY BENEFITS

This application claims the benefit of Provisional Application No. 60/290,380, filed May 11, 2001.

BACKGROUND OF THE INVENTION

The present invention generally relates to chewing gums and methods of making same. More specifically, the present invention relates to chewing gums having improved sensory benefits.

Chewing gum compositions typically include ingredients such as gum base, flavoring agents, bulking agents, sweeteners and other optional ingredients including softeners and coloring agents. Bulking agents and sweeteners often include sugar, glucose syrup and high-intensity sweeteners. The high-intensity sweeteners are most commonly used as applied to sugarless sweeteners.

The gum base defines a water insoluble portion that remains in the mouth of the consumer as the chewing gum is chewed. Flavor and sweeteners define a water soluble portion that is released during the chew. The release of flavors is one of, if not, the most desirable characteristics of chewing gum.

It is desirable to prolong and enhance the sensory benefits, such as flavor, sweeteners, and cooling sensations of the chewing gum as it is chewed. Thus, a variety of methods and compositions for prolonging the release of flavor and sweeteners have been considered and utilized.

With respect to flavors, it is known that the flavor sensation of the chewing gum during chewing can be enhanced and prolonged if the release of sweeteners can be controlled and prolonged. But, sweeteners typically are rapidly released from the chewing gum product. As a result of such an early and rapid release of sweeteners, the chewing gum products lose their flavor after a short period of time.

To address this issue, encapsulating agents are known and used to control and prolong the release of sweeteners. In general, the encapsulating agents include a variety of different food grade encapsulating materials, such as food grade shellac, that can be applied to the gum in a variety of different ways, such as wet granulation, wax granulation, spray drying, spray chilling, fluid bed coating, coacervation, fiber extension and the like. However, the use of encapsulating agents can be expensive and may not be as effective to prolong the release of sweeteners as desired.

A need, therefore exists, for improved chewing gums that exhibit prolonged sensory benefits as the gum is chewed.

SUMMARY OF THE INVENTION

The present invention provides improved chewing gums and methods of making and using same. The chewing gums include sweet organic compounds that have a very low water solubility. These compounds or hydrophobic sweeteners are desirably added to the chewing gum to provide long lasting flavor, sweetness, cooling sensation, tingling sensation or other like chewing gum sensory benefits.

To this end, in an embodiment of the present invention, a chewing gum having prolonged sensory benefits is provided. The chewing gum includes a water insoluble base portion, a water soluble portion, a sensorally active component and a hydrophobic sweetener.

In an embodiment, the chewing gum includes a water soluble portion, a flavor, a plurality of additional sensorally active components and a hydrophobic sweetener.

In an embodiment, the hydrophobic sweetener has the formula selected from the group consisting of

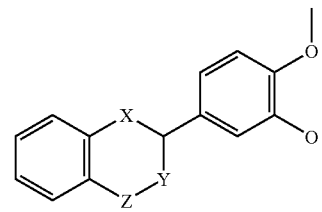

I wherein X, Y and Z are selected from the group consisting of $CH_2$, O and S;

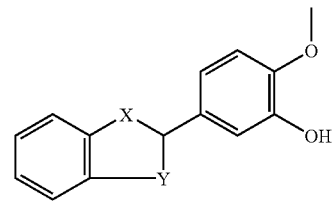

II wherein X and Y are selected from the group consisting of S and O;

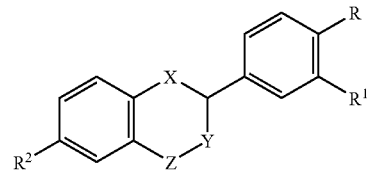

III wherein X is S or O; Y is O or $CH_2$; Z is $CH_2$, $SO_2$, or S; R is $OCH_3$, OH or H; $R^1$ is SH or OH and $R^2$ is H or OH;

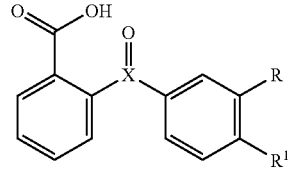

IV wherein X is C or S; R is OH or H and $R^1$ is $OCH_3$ or OH;

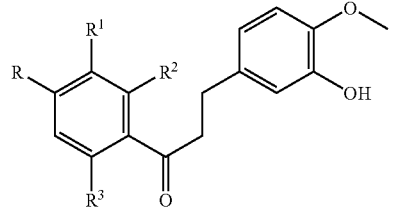

V wherein R, $R^2$ and $R^3$ are OH or H and $R^1$ is H or COOH;

VI

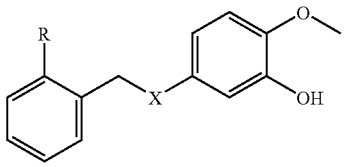

wherein X is O or CH₂ and R is COOH or H;

VII

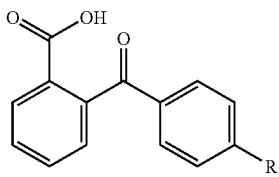

wherein R is CH₃CH₂, OH, N(CH3)₂ or Cl; and

VIII

IX

X

XI

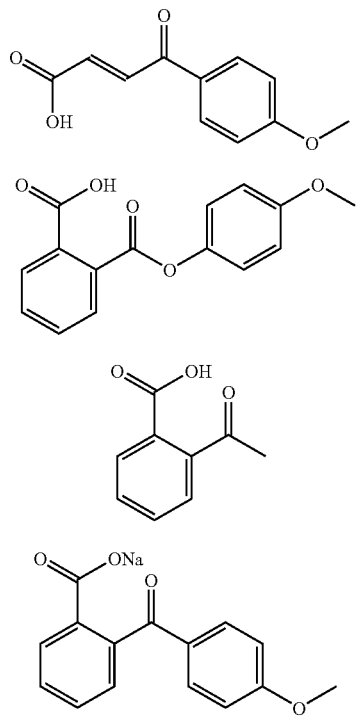

In another embodiment, a method of producing a chewing gum exhibiting prolonged trigeminal effects is provided. The method includes the steps of providing a plurality of chewing gum ingredients including a water insoluble base portion, a water soluble portion, a trigeminal stimulant and a hydrophobic sweetener; processing the ingredients and forming the chewing gum.

In yet another embodiment of the present invention, a method for prolonging sensory benefits of a chewing gum is provided. The method includes the step of chewing the chewing gum including a water insoluble base portion, a water soluble portion, a trigeminal stimulant and a hydrophobic sweetener.

It is, therefore, an advantage of the present invention to provide chewing gums that can prolong the sensory benefits of same as it is chewed.

Another advantage of the present invention is to provide chewing gums that include a hydrophobic sweetener for providing long lasting flavor, sweetness or other like trigeminal effects.

A further advantage of the present invention is to provide chewing gums that include sweet organic compounds which have a very low water solubility to promote and enhance cooling sensations in connection with cooling agents and/or tingling sensations associated with tingling agents.

Yet a still further advantage of the present invention is to provide a method for prolonging sensory benefits of a chewing gum that includes a hydrophobic sweetener and other suitable chewing gum ingredients.

Yet still another advantage of the present invention is a chewing gum for effectively enhancing the sensory benefits of the gum as it is chewed that can be readily produced at reduced costs as compared to, for example, encapsulating sweeteners within the chewing gum.

Additional features and advantages of the present invention are described in, and will be apparent in, the detailed description of the presently preferred embodiments.

DETAILED DESCRIPTION OF THE INVENTION

The present invention provides chewing gums and methods of making and using same. In particular, the chewing gums of the present invention include, in part, hydrophobic sweeteners.

The inventors have uniquely discovered that the use of sweet organic compounds which have very low water solubility (i.e. hydrophobic sweeteners) can be effectively utilized to prolong and enhance sensory benefits of the chewing gum, such as flavoring, cooling sensations, tingling sensations or the like, as the gum is chewed. The chewing gums of the present invention can be composed of ingredients that are readily available and prepared at lower costs as compared to chewing gums that utilize encapsulating agents and methods thereof.

In an embodiment, the chewing gum of the present invention includes a water insoluble base portion, a water soluble portion, a sensorally active component, such as a flavor, and a hydrophobic sweetener. As previously discussed, the addition of the hydrophobic sweetener facilitates the enhancement and prolonged effect of sensory benefits of the chewing gum as it is chewed. Such sensory benefits can include, for example, flavor sensation, cooling sensations, warming sensations, tingling, numbing, pain, itch, mouth coating, combinations thereof or other oral trigeminal effects of chewing gums.

It is believed that the hydrophobic sweeteners can be released at a much slower rate into the aqueous saliva and have a stronger affinity to the lipophyllic or water insoluble gum base portion as compared to known sweeteners. Further, it is believed that the release mechanism of the hydrophobic sweeteners substantially matches that of flavors, cooling agents, tingling agents and other sensorally active components or trigeminal stimulants of the chewing gum. When the hydrophobic sweeteners of the present invention are optionally mixed with the sensorally active component(s) of the gum, the release of such component(s) along with the hydrophobic sweeteners can be prolonged and enhanced as the gum is chewed.

It should be appreciated that due to the slow release of hydrophobic sweeteners from the chewing gum, it is believed that higher levels of the hydrophobic sweeteners as compared to typical water soluble sweeteners may be necessary to provide the desired level of sweetness or sweetness intensity. The amount can suitably vary depending on any number of factors, such as the desired level of sweetness and the relative sweetness intensity specific to the hydrophobic sweetener compound. As detailed below, the relative sweetness can vary depending on the type of hydrophobic sweetener compound.

In an embodiment, chewing gum includes the hydrophobic sweetener compound in an amount ranging from about 50 to about 5000 Sucrose Equivalents. The Sucrose Equivalent factor is determined by multiplying the weight percent of the hydrophobic compound in the chewing gum by its relative sweetness.

The hydrophobic sweetener of the present invention can include a range of suitably sweet organic compounds and mixtures thereof that have a very low water solubility. Preferably, the hydrophobic sweetener compounds are defined by formulas I–XI as follows:

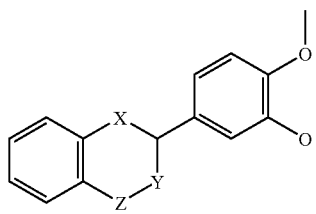

I wherein, X, Y and Z are $CH_2$, O or S;

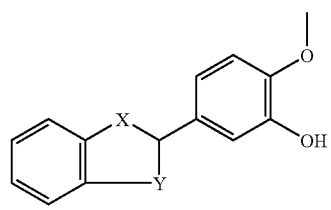

II wherein X and Y are S or O;

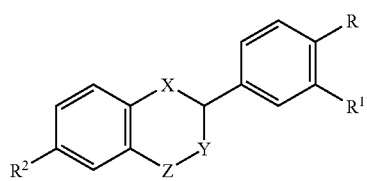

III wherein X is S or O; Y is O or $CH_2$; Z is $CH_2$, $SO_2$, or S; R is $OCH_3$, OH or H; $R^1$ is SH or OH and $R^2$ is H or OH;

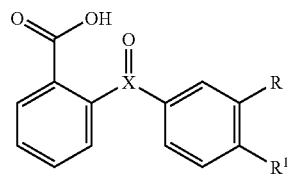

IV wherein X is C or S; R is OH or H and $R^1$ is $OCH_3$ or OH;

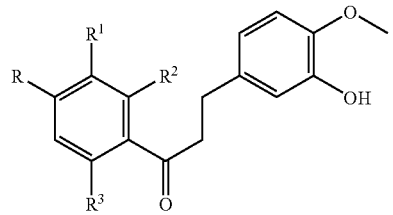

V wherein $R^1$, $R^2$ and $R^3$ are OH or H; and $R^1$ is H or COOH;

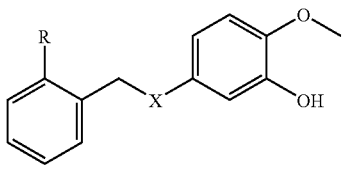

VI wherein X is O or $CH_2$ and R is COOH or H;

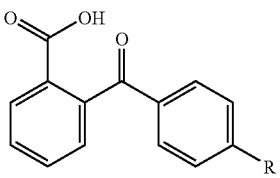

VII wherein R is $CH_3$, $CH_2CH_3$, OH, $N(CH_3)_2$ or Cl; and

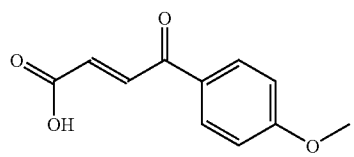

VIII

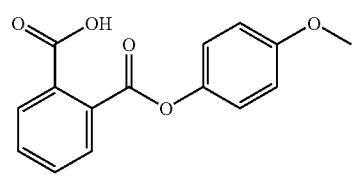

IX

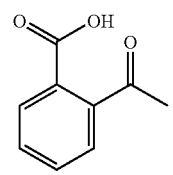

X

-continued

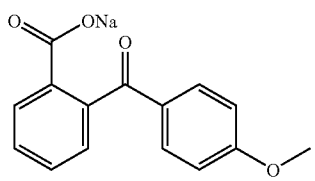

XI

By way of example and not limitation, the following tables illustrate a variety of hydrophobic sweetener compounds representative of the hydrophobic sweetener compounds of Formulas I–XI, as previously discussed. The tables also indicate the relative sweetness of the hydrophobic sweetener compounds. As previously discussed, this factor can be utilized to calculate the Sucrose Equivalent calculation which relates to the amount of hydrophobic sweetener in the chewing gum.

TABLE 1

Hydrophobic Sweeteners of Formula I

| Compound # | X | Y | Z | Relative Sweetness |
|---|---|---|---|---|
| 1 | $CH_2$ | $CH_2$ | O | 200 |
| 2 | $CH_2$ | O | $CH_2$ | 350 |
| 3 | O | $CH_2$ | $CH_2$ | 350 |
| 4 | O | $CH_2$ | O | 450 |
| 5 | O | O | $CH_2$ | 3000 |
| 6 | O | S | $CH_2$ | 500 |
| 7 | O | $CH_2$ | S | 250 |
| 8 | S | O | $CH_2$ | 9000 |
| 9 | S | $CH_2$ | O | 2000 |
| 10 | S | $CH_2$ | $CH_2$ | 200 |
| 11 | S | S | $CH_2$ | 1000 |
| 12 | S | $CH_2$ | S | 450 |

TABLE 2

Hydrophobic Sweeteners of Formula II

| Compound # | X | Y | Relative Sweetness |
|---|---|---|---|
| 13 | S | S | 200 |
| 14 | S | O | 300 |
| 15 | O | O | 150 |

TABLE 3

Hydrophobic Sweeteners of Formula III

| Compound # | X | Y | Z | R | $R^1$ | $R^2$ | Relative Sweetness |
|---|---|---|---|---|---|---|---|
| 16 | S | O | $CH_2$ | $OCH_3$ | SH | H | 50 |
| 17 | S | O | $CH_2$ | OH | OH | H | 200 |
| 18 | S | O | $CH_2$ | H | OH | H | 100 |
| 19 | O | $CH_2$ | $SO_2$ | $OCH_3$ | OH | H | 50 |
| 20 | O | $CH_2$ | S | $OCH_3$ | OH | OH | 500 |

TABLE 4

Hydrophobic Sweeteners of Formula IV

| Compound # | X | R | $R^1$ | Relative Sweetness |
|---|---|---|---|---|
| 21 | C | OH | $OCH_3$ | 250 |
| 22 | C | OH | OH | 100 |
| 23 | S | H | $OCH_3$ | 50 |

TABLE 5

Hydrophobic Sweeteners of Formula V

| Compound # | R | $R^1$ | $R^2$ | $R^3$ | Relative Sweetness |
|---|---|---|---|---|---|
| 24 | OH | H | OH | OH | 665 |
| 25 | H | COOH | H | H | 80 |

TABLE 6

Hydrophobic Sweeteners of Formula VI

| Compound # | X | R | Relative Sweetness |
|---|---|---|---|
| 26 | O | COOH | 10 |
| 27 | $CH_2$ | H | 300 |

TABLE 7

Hydrophobic Sweeteners of Formula VII

| Compound # | R | Relative Sweetness |
|---|---|---|
| 28 | $CH_3$ | N.A. |
| 29 | $CH_2CH_3$ | N.A. |
| 30 | OH | 200 |
| 31 | $N(CH_3)_2$ | N.A. |
| 32 | Cl | N.A. |

TABLE 8

Hydrophobic Sweeteners of Formulas VIII–XI

| Compound # | Formula | Relative Sweetness |
|---|---|---|
| 33 | VIII | 50 |
| 34 | IX | 10 |
| 35 | X | N.A. |
| 36 | XI | 150 |

As previously discussed, the hydrophobic sweeteners of the present invention can be utilized to enhance and extend the flavor, sweetness, cooling, tingling and other sensory benefits of chewing gums as chewed. In an embodiment, the chewing gum of the present invention includes a cooling agent. When mixed with the hydrophobic sweeteners, the cooling effect or sensation of the cooling agents can be prolonged and enhanced as the gum is chewed. The cooling agents can be added to the chewing gum alone or in combination with flavors or other sensorially active components.

The cooling agents can include a range of different suitable materials. For example, the cooling agent can include menthol, WS3, N-substituted p-methane carboxamide, acyclic carboxamides including WS23, menthyl lactate, Takasago Cooling agent (TCA or 3-1-menthoxypropane-1, 2-diol), menthyl succinate and menthone glycerol ketals, other like cooling agents or mixtures thereof.

It should be appreciated that the chewing gum of the present invention is not limited to the type, number and amount of sensorally active component or trigeminal stimulant. The chewing gum of the present invention can include any suitable amount and variety of different sensorally active components alone or in combination with additional other sensorally active components or trigeminal stimulants. When mixed with the hydrophobic sweeteners of the present invention, the trigeminal effects of such components, including, flavor, cooling, tingling, paresthesis, heat, pain, itch, like trigeminal effects or combinations thereof, can be prolonged and enhanced as the gum is chewed as previously discussed.

In an embodiment, the sensorally active components or trigeminal stimulants can include, for example, cooling agents, flavors, tingling agents, Jambu extract, Vanillyl alkyl ethers, such as Vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassia oleoresin, cinnamon oleoresin, cassia oleoresin, cinnamic aldehyde, eugenol, cyclic acetal of vanillin and menthol glycerin ether, unsaturated amides, like components or combinations thereof.

With respect to other ingredients, the chewing gum of the present invention generally consists of a water insoluble gum base, a water soluble portion, and flavors. The water soluble portion dissipates with a portion of the flavor over a period of time during chewing. The gum base portion is retained in the mouth throughout the chew.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants or the like.

Synthetic elastomers may include, but are not limited to, polyisobutylene with GPC weight average molecular weight of about 10,000 to about 95,000 isobutylene-isoprene copolymer (butyl elastomer), styrene-butadiene copolymers having styrene-butadiene ratios of about 1:3 to about 3:1, polyvinyl acetate having GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is abhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizes may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sugarless bulk sweeteners include, but are not limited to, sugar alcohols such as sorbitol, mannitol, xylitol, hydrogenated starch hydrolysates, maltitol, and the like, alone or in combination.

High intensity artificial sweeteners, other than the hydrophobic sweeteners of the present invention, can also be used, alone or in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, 0.2 to 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorally acceptable fashion.

Additional oral health ingredients may be added including but not limited to, antiplaque/anti-gingivitis agents (such as chlorhexidine, CPC, triclosan), pH control agents (including Urea and buffers,) other inorganic components for tarter or caries control (phosphates, fluoride) and biological agents (antibodies, enzymes). The only requirement is that the agents be safe and effective and that they do not react undesirably with each other such as may happen with phosphate salts.

As previously discussed, the present invention provides a method for producing the chewing gum of the present invention. It should be appreciated that the method of making or producing the chewing gum of the present invention can be carried out by any number and variation of suitable processes, such as blending, mixing and/or cooking the ingredients to obtain a desirable consistency or the like. It should also be appreciated that the chewing gum of the present invention can be formed into any suitable size and shape, such as sticks, chunks, pellets or the like.

In an embodiment, a number of chewing gum ingredients at least including a water insoluble base portion, a water soluble portion, a flavor, a hydrophobic sweetener and optionally a cooling agent, tingling agent, like sensorally active components or mixture thereof are processed to form the chewing gum of the present invention. It should be appreciated that the ingredients can be added in any suitable amount.

As previously discussed, the chewing gum ingredients can be processed in any suitable way to form the chewing gum of the present invention. In an embodiment, the hydrophobic sweetener is pre-mixed with the flavor, cooling agent, tingling agent, other hydrophobic sensorally active components of the chewing gum or combinations thereof. The inventors have uniquely discovered that pre-mixing of the ingredients, particularly the hydrophobic sweetener and sensorally active components, can aid in synchronizing the release of same and further can facilitate uniform incorporation of these ingredients into the chewing gum mass.

By way of example and not limitation, the following examples illustrate the compositional breakdown of chewing gums embodying the present invention. For comparison, a chewing gum that does not contain a hydrophobic sweetener is provided in Example 1. It should be appreciated that the hydrophobic sweetener compounds as detailed in the examples are identified by a hydrophobic sweetener number (No.) which corresponds to the hydrophobic sweetener compounds as previously discussed. Examples 1–50 are listed as follows:

| Ingredients | Example 1 (% weight) | Example 2 (% weight) | Example 3 (% weight) | Example 4 (% weight) |
|---|---|---|---|---|
| Gum Base | 30.0 | 30.0 | 30.0 | 40.0 |
| Sugar | 56.8 | 56.6 | 55.2 | 45.2 |
| Corn Syrup | 10.0 | 10.0 | 10.0 | 9.0 |
| Glycerin | 2.0 | 2.0 | 3.0 | 3.5 |
| Peppermint Flavor | 1.0 | 1.0 | 1.2 | 1.7 |
| WS3 | 0.2 | 0.2 | | |
| Menthyl Lactate | | | 0.3 | |
| Menthone Ketal | | | | 0.5 |
| Hydrophobic Sweetener Compound | | 0.2 | 0.3 | 0.1 |
| Total | 100.0 | 100.0 | 100.0 | 100.0 |
| Hydrophobic Sweetener Compound No. | N.A. | 13 | 12 | 8 |

| Ingredients | Example 5 (% weight) | Example 6 (% weight) | Example 7 (% weight) | Example 8 (% weight) |
|---|---|---|---|---|
| Base | 25.20 | 25.20 | 25.20 | 25.20 |
| Sorbitol | 51.24 | 51.04 | 51.14 | 51.14 |
| Mannitol | 4.25 | 4.25 | 4.25 | 4.25 |
| Coevaporated Lycasin/Glycerin | 8.50 | 8.50 | 8.50 | 8.50 |
| Glycerin | 8.50 | 8.50 | 8.50 | 8.50 |
| Wintergreen Flavor | 1.20 | 1.20 | 1.20 | 1.20 |
| Lecithin | 0.16 | 0.16 | 0.16 | 0.16 |
| Menthol | 0.30 | 0.30 | 0.30 | 0.30 |
| WS3 | 0.05 | 0.05 | 0.05 | 0.05 |
| Free Aspartame | 0.40 | 0.40 | 0.40 | 0.40 |
| Hydrophobic Sweetener Compound | 0.20 | 0.40 | 0.30 | 0.30 |
| Total | 100.00 | 100.00 | 100.00 | 100.00 |
| Hydrophobic Sweetener Compound No. | 29 | 1 | 2 | 3 |

| Ingredients | Example 9 (% weight) | Example 10 (% weight) | Example 11 (% weight) | Example 12 (% weight) | Example 13 (% weight) |
|---|---|---|---|---|---|
| Base | 25.20 | 25.20 | 25.20 | 25.20 | 25.20 |
| Sorbitol | 51.89 | 52.04 | 51.24 | 51.99 | 51.73 |
| Mannitol | 4.25 | 4.25 | 4.25 | 4.25 | 4.25 |
| Coevaporated Lycasin/Glycerin | 8.50 | 8.50 | 8.50 | 8.50 | 8.50 |
| Glycerin | 8.50 | 8.50 | 8.50 | 8.50 | 8.50 |
| Peppermint Flavor | 1.20 | 1.20 | 1.20 | 1.20 | 1.20 |
| Lecithin | 0.16 | 0.16 | 0.16 | 0.16 | 1.00 |
| Free Aspartame | — | — | 0.40 | — | 0.16 |
| Hydrophobic Sweetener Compound | 0.30 | 0.15 | 0.55 | 0.20 | 0.30 |
| Total | 100.00 | 100.00 | 100.00 | 100.00 | 100.00 |
| Hydrophobic Sweetener Compound No. | 4 | 5 | 16 | 6 | 7 |

| Ingredients | Example 14 (% weight) | Example 15 (% weight) | Example 16 (% weight) |
|---|---|---|---|
| Base | 31.99 | 31.99 | 31.99 |
| Sorbitol | 57.70 | 57.63 | 57.61 |
| Mannitol | 7.00 | 7.00 | 3.50 |
| Xylitol | — | — | 3.50 |
| Peppermint Flavor | 1.70 | 1.70 | 1.70 |
| Acesulfame K | 1.00 | 1.00 | — |
| Sucralose | — | — | 0.15 |
| Lecithin | 0.55 | 0.55 | 0.55 |
| Hydrophobic Sweetener Compound | 0.06 | 0.13 | 1.00 |
| Total | 100.00 | 100.00 | 100.00 |
| Hydrophobic Sweetener Compound No. | 8 | 9 | 10 |

| Ingredients | Example 17 (% weight) | Example 18 (% weight) | Example 19 (% weight) | Example 20 (% weight) | Example 21 (% weight) |
|---|---|---|---|---|---|
| Base | 70.50 | 65.64 | 68.25 | 71.90 | 59.65 |
| Talc | 18.00 | 11.75 | 23.00 | 16.00 | 14.00 |
| Atomite | — | 15.00 | — | — | 14.00 |
| Xylitol | 7.62 | 4.05 | 5.20 | 8.45 | 7.30 |
| Vanillyl N-Butyl Ether | 0.08 | — | — | 0.10 | — |
| Jambu Extract | — | 1.00 | — | 0.20 | — |
| Ginger Oleoresin | — | — | — | — | 0.10 |
| Echinacea Extract | — | — | — | 0.20 | — |
| Aspartame | 0.75 | — | — | — | — |
| Acesulfame K | 0.75 | — | 0.50 | 0.70 | 1.25 |
| Encapsulated Acesulfame K | — | 0.75 | 1.00 | 1.00 | 0.75 |
| Menthol | — | 0.20 | 0.30 | — | 0.40 |
| Takasago Cooling Agent | — | 0.10 | — | 0.05 | 0.20 |
| Hydrophobic Sweetener Compound | 1.00 | 0.01 | 0.25 | 0.40 | 0.35 |
| Cinnamon Flavor | 1.30 | 1.50 | 1.50 | 1.00 | 2.00 |
| Total | 100.00 | 100.00 | 100.00 | 100.00 | 100.00 |
| Hydrophobic Sweetener Compound No. | 13 & 27 (50:50) | 11 & 20 (10:90) | 12 | 13 | 14 |

| Ingredients | Example 22 (% weight) | Example 23 (% weight) | Example 24 (% weight) | Example 25 (% weight) | Example 26 (% weight) |
|---|---|---|---|---|---|
| Base | 33.00 | 33.00 | 32.00 | 32.00 | 32.00 |
| Sorbitol | 46.43 | 45.19 | 39.52 | 37.52 | 37.67 |
| Calcium Carbonate | 13.00 | 13.00 | 15.00 | 15.00 | 15.00 |
| 70% Sorbitol Solution | — | — | 7.50 | 7.50 | 7.50 |
| Spray Dried Takasago Cooling Agent | — | — | 2.00 | 2.00 | 2.00 |
| Menthone Glycerol Ketal | — | — | 0.14 | 0.14 | 0.14 |
| Eucalyptus Flavor | — | — | 0.96 | 0.96 | 0.96 |
| Glycerin | 4.00 | 4.00 | 0.75 | 0.75 | 0.75 |
| Peppermint Flavor | 1.95 | 1.95 | — | — | — |
| Lecithin | 0.45 | 0.45 | — | — | — |
| Menthol | 0.35 | 0.35 | 1.26 | 1.26 | 1.26 |
| Encapsulated Aspartame | — | 0.68 | 0.37 | 0.87 | 0.50 |
| Aspartame | 0.12 | — | — | — | 0.10 |
| Sodium Bicarbonate | — | 0.38 | — | 0.50 | 0.50 |
| Sodium Carbonate | — | — | — | — | 0.12 |
| Hydrophobic Sweetener Compound | 0.70 | 1.00 | 0.50 | 1.50 | 1.50 |
| Total | 100.00 | 100.00 | 100.00 | 100.00 | 100.00 |
| Hydrophobic Sweetener Compound No. | 15 | 16 | 17 | 19 | 19 |

| Ingredients | Example 27 (% weight) | Example 28 (% weight) | Example 29 (% weight) | Example 30 (% weight) |
|---|---|---|---|---|
| Gum Base | 29.4 | 31.0 | 29.4 | 29.1 |
| Sorbitol | 54.4 | 53.4 | 54.6 | 55.6 |
| Glycerin | 11.2 | 10.9 | 11.2 | 10.9 |
| Water | 0.7 | 0.7 | 0.7 | 0.7 |
| Encapsulated Acesulfame K | 0.2 | 0.1 | 0.1 | 0.2 |

-continued

| Ingredients | Example 27 (% weight) | Example 28 (% weight) | Example 29 (% weight) | Example 30 (% weight) |
|---|---|---|---|---|
| Lecithin | 0.4 | 0.4 | 0.4 | 0.4 |
| Aspartame | 0.1 | — | — | — |
| Flavor | 3.0 | 3.0 | 3.0 | 2.4 |
| Color | 0.1 | 0.1 | 0.1 | 0.1 |
| Hydrophobic Sweetener Compound | 0.5 | 0.4 | 0.5 | 0.6 |
| Total | 100.0 | 100.0 | 100.0 | 100.0 |
| Hydrophobic Sweetener Compound No. | 24 | 20 | 21 | 22 |

| Ingredients | Example 31 (% weight) | Example 32 (% weight) | Example 33 (% weight) | Example 34 (% weight) | Example 35 (% weight) |
|---|---|---|---|---|---|
| Base | 30.50 | 24.90 | 27.50 | 31.35 | 27.00 |
| Sorbitol | 56.55 | 63.85 | 55.50 | 54.15 | 57.50 |
| Hydrogenated Starch Hydrolysate | 8.00 | 7.00 | 7.00 | 8.50 | 8.00 |
| Citric Acid | 2.00 | — | 1.00 | 2.00 | 0.50 |
| Malic Acid | — | 2.00 | 1.00 | 1.00 | 2.00 |
| Aspartame | 0.45 | 0.75 | 1.00 | — | 1.00 |
| Hydrophobic Sweetener Compound | 1.00 | 0.20 | 5.00 | 1.00 | 2.00 |
| Strawberry Flavor | — | 0.85 | — | 1.00 | 2.00 |
| Lemon Flavor | 1.50 | 0.45 | 2.00 | 1.00 | — |
| Total | 100.00 | 100.00 | 100.00 | 100.00 | 100.00 |
| Hydrophobic Sweetener Compound No. | 23 | 24 | 26 | 25 | 26 |

| Ingredients | Example 36 (% weight) | Example 37 (% weight) | Example 38 (% weight) | Example 39 (% weight) | Example 40 (% weight) |
|---|---|---|---|---|---|
| Sugarless Syrup** | 70.35 | 28.00 | 37.80 | — | — |
| Xylitol | — | 7.27 | 31.50 | 63.90 | 59.40 |
| Sorbitol | — | 33.00 | — | — | — |
| Gum Base | 25.00 | 27.00 | 25.90 | 32.00 | 35.00 |
| Acesulfame K | — | 0.33 | 0.05 | — | 0.10 |
| Encapsulated Aspartame | — | — | 0.86 | 0.55 | 0.10 |
| Hydrophobic Sweetener Compound | 0.45 | 0.40 | 0.40 | 0.40 | 0.40 |
| Menthol | 0.50 | — | 0.10 | — | — |
| Spray dried Takasago Cooling Agent (22% active) | 0.20 | — | .07 | — | — |
| Menthyl Succinate | — | — | 0.02 | — | — |
| Peppermint Flavor | 3.50 | 4.00 | 2.05 | 3.10 | 4.75 |

-continued

| Ingredients | Example 36 (% weight) | Example 37 (% weight) | Example 38 (% weight) | Example 39 (% weight) | Example 40 (% weight) |
|---|---|---|---|---|---|
| Cocoa Powder | — | — | 0.15 | — | — |
| Glycerin | — | — | 0.85 | — | — |
| Hydroxylated Lecithin | — | — | 0.10 | — | — |
| Water | — | — | 0.10 | — | — |
| Salt Solution (90%) | — | — | 0.05 | 0.05 | — |
| Color | — | — | — | — | 0.25 |
| Total | 100.00 | 100.00 | 100.00 | 100.00 | 100.00 |
| Hydrophobic Sweetener Compound No. | 27 & 28 (50:50) | 28 | 8 | 30 | 29 + 30 29 & 30 (50:50) |

**Sugarless syrup contains 51.75% sorbitol, 39.50% glycerin, 4.00% mannitol, 2.00% maltitol and 2.75% water.

| Ingredients | Example 41 (% weight) | Example 42 (% weight) | Example 43 (% weight) | Example 44 (% weight) | Example 45 (% weight) |
|---|---|---|---|---|---|
| Sugar | 51.99 | 54.28 | 54.24 | 46.07 | 54.05 |
| Base | 26.10 | 26.10 | 26.10 | 26.10 | 26.10 |
| Corn Syrup | 17.00 | 17.00 | 17.00 | 17.00 | 17.00 |
| Cinnamon Flavor | 1.00 | 1.40 | 1.30 | 0.95 | 1.00 |
| Capsaicin | 0.01 | — | — | 0.01 | — |
| Cyclic Acetal of Vanillin and Menthol Glycerin Ether | — | 0.02 | — | 0.01 | — |
| Northern Prickly Ash Extract | — | — | 0.06 | — | 0.10 |
| Glycerin | 1.20 | 1.20 | 1.20 | 1.20 | 1.20 |
| Hydrophobic Sweetener Compound | 1.50 | 0.40 | 0.40 | 0.75 | 0.55 |
| Total | 100.00 | 100.00 | 100.00 | 100.00 | 100.00 |
| Hydrophobic Sweetener Compound No. | 1 | 31 | 32 | 4 | 20 |

| Ingredients | Example 46 (% weight) | Example 47 (% weight) | Example 48 (% weight) | Example 49 (% weight) | Example 50 (% weight) |
|---|---|---|---|---|---|
| Sugar | 54.60 | 53.60 | 51.60 | 55.20 | 55.25 |
| Base | 19.00 | 19.00 | 19.00 | 19.00 | 19.00 |
| Corn Syrup | 13.00 | 13.00 | 13.00 | 13.00 | 13.00 |
| Glycerin | 1.50 | 1.50 | 1.50 | 1.50 | 1.50 |
| Dextrose Monohydrate | 10.00 | 10.00 | 10.00 | 10.00 | 10.00 |
| Peppermint Flavor | 0.90 | 0.90 | 0.90 | 0.90 | 0.90 |

-continued

| Ingredients | Example 46 (% weight) | Example 47 (% weight) | Example 48 (% weight) | Example 49 (% weight) | Example 50 (% weight) |
|---|---|---|---|---|---|
| Hydrophobic Sweetener Compound | 1.00 | 2.00 | 4.00 | 0.40 | 0.35 |
| Total | 100.00 | 100.00 | 100.00 | 100.00 | 100.00 |
| Hydrophobic Sweetener Compound No. | 14 | 33 | 34 | 35 | 36 |

As indicated in the Examples, the critical distinction between Examples 2–50 and Example 1 is that Example 1 does not include a hydrophobic sweetener compound. As previously discussed, the inventors have uniquely discovered that the addition of a hydrophobic sweetener to chewing gum can prolong and enhance the release of flavors (i.e., peppermint flavor), cooling agents (i.e., WS3), tingling agents (i.e., Vanillyl n-butyl ether), like sensorally active components or combinations thereof as compared to the chewing gums without hydrophobic sweeteners.

It should be appreciated that various changes and modifications to the presently preferred embodiments described herein will be apparent to those skilled in the art. Such changes and modifications can be made without departing from the spirit and scope of the present invention and without diminishing its intended advantages. It is therefore intended that all such changes and modifications be covered by the appending claim.

The invention claimed is:

1. A chewing gum having prolonged sensory benefits comprising:
   a water insoluble base portion;
   a water soluble portion;
   a sensorally active component; and
   a hydrophobic sweetener having the formula

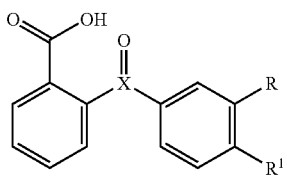

wherein X is C or S; R is OH or H and $R^1$ is $OCH_3$ or OH.

2. The chewing gum of claim 1 wherein the sensory benefits include flavor sensations, tingling, numbing, mouth coating, cooling/warming sensations, pain, itch or combinations thereof.

3. The chewing gum of claim 1 wherein the sensorally active component is selected from the group consisting of a flavor, a cooling agent, a tingling agent, Jambu extract, Vanillyl alkyl ethers, Vanillyl n-butyl ether, spilanthol, Echinacea extract, Northern Prickly Ash extract, capsaicin, capsium oleoresin, red pepper oleoresin, black pepper oleoresin, piperine, ginger oleoresin, gingerol, shoagol, cinnamon oleoresin, cassia oleoresin, cinnamic aldehyde, eugenol, cylic acetal of vanillin, menthol glycerin ether, unsaturated amides and combinations thereof.

4. The chewing gum of claim 3 wherein the cooling agent is selected from the group consisting of menthol, WS3, N-substituted p-menthane carboxamide, acyclic carboxamides, WS23, menthyl lactate, Takasago Cooling agent, 3-1-menthoxypropane-1,2-diol, menthyl, succinate, menthone glycerol ketals and mixtures thereof.

5. The chewing gum of claim 1 wherein the hydrophobic sweetener is in an amount ranging from about 50 Sucrose Equivalents to about 5000 Sucrose Equivalents.

6. A chewing gum having prolonged sensory benefits comprising a water insoluble base portion; a water soluble portion; a flavor; a plurality of additional sensorally active components; and a hydrophobic sweetener wherein the hydrophobic sweetener has the formula

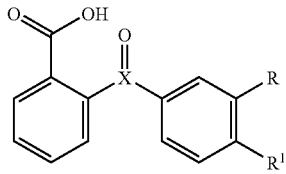

wherein X is C or S; R is OH or H; $R^1$ is $OCH_3$; or OH.

7. The chewing gum of claim 6 wherein the additional sensorally active components are selected from the group consisting of a cooling agent, menthol, WS3, N-substituted p-menthane carboxamide, acyclic carboxamides, WS23, menthyl lactate, Takasago Cooling agent, 3-1-menthoxypropane-1,2-diol, menthyl succinate, menthone glycerol ketals, a tingling agent, Jambu extract, Vanillyl alkyl ethers, Vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassia oleoresin, cinnamic aldehyde, eugenol, cyclic acetal of vanillin, menthol glycerin ether, unsaturated amides and combinations thereof.

8. A method of producing a chewing gum exhibiting prolonged trigeminal effects comprising the steps of:
   providing a plurality of chewing gum ingredients including a water insoluble base portion, a water soluble portion, a trigeminal stimulant and a hydrophobic sweetener having the formula;
   processing the ingredients; and
   forming the chewing gum

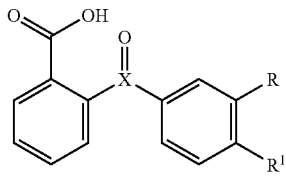

wherein X is C or S; R is OH or H and $R^1$ is $OCH_3$ or OH.

9. The method of claim 8 wherein the hydrophobic sweetener is in an amount ranging from about 50 Sucrose Equivalents to about 5000 Sucrose Equivalents.

10. The method of claim 8 wherein the ingredients are processed by pre-mixing the hydrophobic sweetener with the trigeminal stimulant.

11. The method of claim 8 wherein the trigeminal stimulant is selected from the group consisting of a flavor, a cooling agent, menthol, WS3, N-substituted p-menthane carboxamide, acyclic carboxamides, WS23, menthyl lactate, Takasago Cooling agent, 3-1-menthoxypropane-1,2-diol, menthyl succinate, menthone glycerol ketals, a tingling agent, Jambu extract, Vanillyl alkyl ethers, Vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassia oleoresin, cinnamic aldehyde, eugenol, cyclic acetal of vanillin, menthol glycerin ether, unsaturated amides and combinations thereof.

12. A method for prolonging sensory benefits of a chewing gum comprising the step of chewing the chewing gum which includes a water insoluble base portion, a water soluble portion, a trigeminal stimulant and a hydrophobic sweetener including a sweet organic compound having the formula

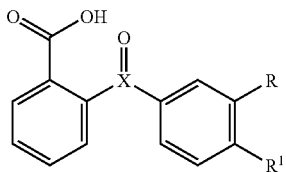

wherein X is C or S; R is OH or H and $R^1$ is $OCH_3$ or OH.

13. The method of claim 12 wherein the trigeminal stimulant is selected from the group consisting of a flavor, a cooling agent, menthol, WS3, N-substituted p-menthane carboxamide, acyclic carboxamides, WS23, menthyl lactate, Takasago Cooling agent, 3-1-menthoxypropane-1,2-diol, menthyl succinate, menthone glycerol ketals, a tingling agent, Jambu extract, Vanillyl alkyl ethers, Vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassia oleoresin, cinnamic aldehyde, eugenol, cyclic acetal of vanillin, menthol glycerin ether, unsaturated amides and combinations thereof.

* * * * *